US012275024B2

(12) United States Patent
Burgess et al.

(10) Patent No.: US 12,275,024 B2
(45) Date of Patent: Apr. 15, 2025

(54) APPARATUS AND METHOD FOR COATING SUBSTRATES WITH WASHCOATS

(71) Applicant: JOHNSON MATTHEY PUBLIC LIMITED COMPANY, London (GB)

(72) Inventors: Neil Burgess, Royston (GB); Jamie Savage, Royston (GB); Craig Thomson, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 18/480,527

(22) Filed: Oct. 4, 2023

(65) Prior Publication Data

US 2024/0024898 A1 Jan. 25, 2024

Related U.S. Application Data

(62) Division of application No. 16/695,531, filed on Nov. 26, 2019, now Pat. No. 11,911,780.

(30) Foreign Application Priority Data

Nov. 29, 2018 (GB) ..................................... 1819454

(51) Int. Cl.

| | |
|---|---|
| ***B05B 1/18*** | (2006.01) |
| ***B05B 12/20*** | (2018.01) |
| ***B05C 5/02*** | (2006.01) |
| ***B05D 1/02*** | (2006.01) |

(52) U.S. Cl.

CPC .............. *B05B 1/185* (2013.01); *B05B 12/20* (2018.02); *B05C 5/027* (2013.01); *B05D 1/02* (2013.01)

(58) Field of Classification Search

None

See application file for complete search history.

(56) References Cited

U.S. PATENT DOCUMENTS

| | | | |
|---|---|---|---|
| 6,513,735 B1 | 2/2003 | Clark | |
| 7,879,183 B2 | 2/2011 | Yousif | |
| 8,757,517 B2 | 6/2014 | Whitaker | |
| 8,888,020 B2 | 11/2014 | Huang | |
| 9,068,262 B2 * | 6/2015 | Kudela | H01J 37/32623 |
| 9,677,176 B2 | 6/2017 | Chandrasekharan | |
| 9,988,712 B2 | 6/2018 | Sufan | |
| 10,023,959 B2 | 7/2018 | Sung | |
| 10,130,958 B2 | 11/2018 | Tam | |

(Continued)

FOREIGN PATENT DOCUMENTS

| | | |
|---|---|---|
| JP | 60116126 A | 6/1985 |
| KR | 20030065531 A | 8/2003 |

(Continued)

*Primary Examiner* — Jethro M. Pence

(57) ABSTRACT

A washcoat showerhead for depositing a washcoat onto a face of a substrate comprises a housing having an inlet for receiving the washcoat, a showerhead plate and a baffle. The housing and showerhead plate define a showerhead cavity with the baffle located within the showerhead cavity. The showerhead plate has a plurality of nozzle apertures for discharging the washcoat towards the face of the substrate. The baffle comprises an impermeable central body and a plurality of arms extending from the impermeable central body, the plurality of arms defining a plurality of flow apertures circumferentially arranged around the impermeable central body.

14 Claims, 10 Drawing Sheets

(56) References Cited

U.S. PATENT DOCUMENTS

| | | | |
|---|---|---|---|
| 10,159,991 | B2 | 12/2018 | Sharratt |
| 10,184,178 | B2 | 1/2019 | Kim |
| 10,312,129 | B2 | 6/2019 | Coomer |
| 10,358,715 | B2 | 7/2019 | Kaufman-Osborn |
| 10,373,810 | B2 | 8/2019 | Noorbakhsh |
| 10,494,717 | B2 | 12/2019 | Sung |
| 10,607,817 | B2 | 3/2020 | Franklin |
| 10,770,272 | B2 | 9/2020 | Hawrylchak |
| 11,278,919 | B2 | 3/2022 | Quinn |
| 11,348,769 | B2 | 5/2022 | Hawrylchak |
| 11,420,217 | B2 | 8/2022 | Mustafa |
| 11,440,044 | B2 * | 9/2022 | Burgess .................... B05B 1/18 |
| 11,548,017 | B2 * | 1/2023 | Rexach ................. E03C 1/0405 |
| 11,970,775 | B2 * | 4/2024 | Kothnur .................... B05B 1/20 |
| 2004/0124265 | A1 | 7/2004 | Kaelberer |
| 2004/0200413 | A1 | 10/2004 | Lee |
| 2006/0130750 | A1 | 6/2006 | Ishikawa |
| 2011/0120505 | A1 | 5/2011 | Yousif |
| 2012/0021896 | A1 | 1/2012 | Nakano et al. |
| 2014/0061324 | A1 | 3/2014 | Mohn et al. |
| 2015/0034738 | A1 | 2/2015 | Xu |
| 2017/0301515 | A1 | 10/2017 | Madsen et al. |
| 2017/0326561 | A1 | 11/2017 | Sharratt |
| 2019/0351433 | A1 | 11/2019 | Mustafa |
| 2020/0048767 | A1 | 2/2020 | Kothnuri |
| 2020/0171515 | A1 | 6/2020 | Burgess |
| 2020/0227242 | A1 | 7/2020 | Franklin |
| 2021/0008574 | A1 | 1/2021 | Rexachi |
| 2022/0168758 | A1 | 6/2022 | Quinn |
| 2022/0193651 | A1 | 6/2022 | Muruyandy |
| 2022/0362797 | A1 * | 11/2022 | Burgess ............. B01D 46/2418 |
| 2023/0057217 | A1 * | 2/2023 | Povolny .................. B05B 1/005 |
| 2023/0140263 | A1 * | 5/2023 | Lakshmana ......... C23C 16/4557<br>239/565 |
| 2023/0294116 | A1 * | 9/2023 | Iyengar ................... B05B 1/185<br>239/548 |

FOREIGN PATENT DOCUMENTS

| | | | |
|---|---|---|---|
| RU | 2241065 | C2 | 11/2004 |
| WO | 9947260 | A1 | 9/1999 |
| WO | 2002060592 | A1 | 8/2002 |
| WO | 2011080525 | A1 | 7/2011 |
| WO | 2015145122 | A2 | 10/2015 |

* cited by examiner

APPARATUS AND METHOD FOR COATING SUBSTRATES WITH WASHCOATS

The present disclosure relates to apparatus and methods for coating substrates with washcoats. In particular, it relates to the coating of substrates used for purification of exhaust gases.

BACKGROUND TO THE DISCLOSURE

Large numbers of emissions control devices comprising coated monolithic substrates are manufactured each year. One of the principal uses of such devices is for the treatment of exhaust gases, such as the exhaust gases produced by a power plant or by an internal combustion engine, particularly a vehicular internal combustion engine. The monolithic substrate contains a plurality of channels that bring the exhaust gas into contact with a coating on the channel walls within the substrate. This coating may trap, oxidise and/or reduce constituents of the exhaust gas that are hazardous to human health or that are environmentally unfriendly. The monolithic substrate may also be a filter substrate, which can remove soot (i.e. particulate matter), such as the soot produced by internal combustion engines.

A substrate for purification of exhaust gases may typically comprise a monolithic substrate that is provided with passages for the through-flow of exhaust gases. The substrate may be provided with a coating, which may be a catalytic coating. The coating may be applied to the substrate as a washcoat that is passed through the passages of the substrate. Various methods for applying the coating to a substrate are known. One such method involves applying washcoat to a first face of the substrate (e.g. an upper face) and subjecting an opposite, second face (e.g. a lower face) of the substrate to at least a partial vacuum to achieve movement of the washcoat through the passages. After coating the substrate may be dried and calcined.

The substrate may be configured as a flow-through substrate wherein each passage is open at both the first and second faces of the substrate and the passage extends through the whole length of the substrate. Consequently, exhaust gases entering through a first face of the substrate into a passage pass through the substrate within the same passage until the exhaust gases exit a second face of the substrate. Alternatively, the substrate may be configured as a filter substrate, in which some passages are plugged at a first face of the substrate and other passages are plugged at a second face of the substrate. In such a configuration, exhaust gases entering through a first face of the substrate into a first passage flow along that first passage part-way along the substrate and then pass through a filtering wall of the substrate into a second passage. The exhaust gases then pass along said second passage and out of a second face of the substrate. Such an arrangement has become known in the art as a wall-flow filter.

The coated filter substrate or product may, for example, be a filter substrate comprising an oxidation catalyst (e.g. a catalysed soot filter [CSF]), a selective catalytic reduction (SCR) catalyst (e.g. the product may then be called a selective catalytic reduction filter [SCRF] catalyst), a NOx adsorber composition (e.g. the product may then be called a lean NOx trap filter [LNTF]), a three-way catalyst composition (e.g. the product may then be called a gasoline particulate filter [GPF]), an ammonia slip catalyst [ASC] or a combination of two or more thereof (e.g. a filter substrate comprising a selective catalytic reduction (SCR) catalyst and an ammonia slip catalyst [ASC]).

The substrate may be coated in a single dose wherein washcoat may be applied to the substrate in a single step with the substrate remaining in a single orientation. Alternatively, the substrate may be coated in two doses. For example, in a first dose the substrate is in a first orientation with a first face uppermost and a second face is lowermost. A coating is applied to the first face and coats a portion of the length of the substrate. The substrate is then inverted so that the second face is uppermost. A coating is then applied to the second face in order to coat the portion of the substrate that was uncoated by the first dose. Beneficially, a two-dose process may allow different coatings to be applied to each end of the substrate.

To provide best performance of the substrate it may be beneficial to ensure that the substrate is fully coated so that the surface area of the coated substrate is maximised. However, it is also beneficial to ensure that portions of the substrate are not coated by more than one layer of washcoat (for example, in a two-dose process) as this can lead to increased pressure loss within the substrate. It is therefore desirable that the process of applying the washcoat to substrates achieves reliable and controllable coating profiles of the substrates.

One of the challenges in manufacturing coated filter substrates relates to the application of a uniform coating onto the walls of the channels of the filter substrate. This is because each channel of a filter substrate generally has only one open end (the other end being closed, usually by plugging), which is problematic for the application of a washcoat. It can be difficult to apply a washcoat to the channels of a filter substrate to obtain a desired coating depth, an even coating depth across all of the channels and a uniform washcoat distribution within each channel.

WO 99/47260 describes a general method for coating a monolithic support. A method of coating a flow-through honeycomb substrate is exemplified in WO 99/47260. This method is typically used to apply a washcoat having a relatively high viscosity.

One method that shows good results for uniformly applying washcoat onto the walls of a filter substrate is described in WO 2011/080525. WO 2011/080525 describes a method of coating a honeycomb monolith substrate comprising a plurality of channels with a liquid comprising a catalyst component, which method comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

Another method for the application of a washcoat onto the walls of a filter substrate is described in WO2015/145122. The method utilises a "showerhead" comprising a plurality of apertures arranged to deposit the liquid evenly onto the upper end face of the filter substrate.

For some products there may be a desire to use washcoats for filter substrates which have a relatively low viscosity and minimal rheology properties. The present applicant has found that this can cause problems with achieving reliable and controllable coating profiles of the substrates because the rheology of the washcoat means that it is difficult to apply the washcoat uniformly to the upper face of the substrate. In particular, application of the washcoat to the upper face of the substrate may be by use of a washcoat showerhead which comprises a showerhead plate provided with an array of nozzle apertures. With low viscosity washcoats it has been found to be difficult to ensure a uniform discharge of the washcoat from the showerhead plate. This can lead to problems of uncoated portions of the substrate after coating, where too little washcoat is applied to a region of the substrate, or alternatively 'pull-through', where excess substrate is drawn out of the lower face of the substrate, where too much washcoat is applied to a region of the substrate.

US2012/0021896 teaches a nozzle configured to discharge a fluid containing a raw material of a catalytic layer to a substrate, the nozzle being provided with discharge ports for discharging the fluid towards a first end face of the substrate. The nozzle may be provided with a deflector in the form of a mesh or perforated plate which causes a change in the flow of the fluid within the nozzle.

SUMMARY OF THE DISCLOSURE

In a first aspect the present disclosure provides a washcoat showerhead for depositing a washcoat onto a face of a substrate located below the washcoat showerhead, the washcoat showerhead comprising:

- a housing having an inlet for receiving the washcoat;
- a showerhead plate; and
- a baffle;
- the housing and showerhead plate defining a showerhead cavity and the baffle being located within the showerhead cavity;
- the showerhead plate comprising a plurality of nozzle apertures for discharging the washcoat towards the face of the substrate;
- the baffle comprising an impermeable central body and a plurality of arms extending from the impermeable central body, the plurality of arms defining a plurality of flow apertures circumferentially arranged around the impermeable central body;
- the baffle being mounted in the showerhead cavity such that the impermeable central body is spaced from the showerhead plate;
- the impermeable central body being aligned below the inlet of the housing such that washcoat entering the showerhead cavity through the inlet is diverted to flow around the impermeable central body and through the plurality of flow apertures before being discharged through the nozzle apertures of the showerhead plate.

Advantageously, the washcoat showerhead of the present disclosure comprising such a baffle may result in more even coating of the substrate and, in particular, may produce more reliable and controllable coating profiles. Use of the washcoat showerhead may thus allow for a maximisation of the surface area of the substrate that is coated while minimising the degree of overlapping of coatings and/or pull-through of the washcoat.

The baffle may comprise a plurality of arms, e.g. four arms, extending from the impermeable central body, the plurality of (e.g. four) arms defining a plurality (e.g. four) flow apertures circumferentially arranged around the impermeable central body; and optionally the plurality of (e.g. four) arms may be equispaced circumferentially around the impermeable central body. The plurality of arms may extend radially from the impermeable central body; and optionally wherein a width of each of the plurality of arms may increase from a location proximate to the impermeable central body to a location distal the impermeable central body. Four arms may preferably be provided.

The impermeable central body may be circular in shape in plan view. The impermeable central body may have a diameter greater than a diameter of the inlet to the housing; and optionally wherein a central longitudinal axis of the inlet and a central axis of the impermeable central body may be coincident. The impermeable central body may have a diameter of 20 to 55 mm; preferably 25 to 50 mm; more preferably selected to be 27, 35 or The inlet of the housing may have an internal diameter of up to 25.4 mm (1 inch).

An upper face of the impermeable central body facing the inlet may comprise a protrusion; preferably wherein the protrusion is a conical, or part-conical surface.

Advantageously, the provision of a protrusion on the upper face has been found to minimise turbulence within the washcoat showerhead as the washcoat is directed to the periphery of the showerhead plate.

The baffle may be mounted to at least one of the housing and the showerhead plate; preferably wherein the baffle is mounted to only the housing. The baffle may be mounted to mounting points of the housing which surround, but do not impinge on, the inlet of the housing. The baffle may be mounted by fixatives extending between the plurality of arms and at least one of the housing and the showerhead plate. The fixatives may extend from a distal end of each of the plurality of arms. The fixatives may be located on a pitch circle diameter of 65 to 75 mm; preferably 70 mm, and may be centred on a central axis of the impermeable central body. Preferably the fixatives are located outside the diameter of the impermeable central body.

Advantageously, it has been found that positioning the fixatives outside the diameter of the impermeable central body may minimise interference of the fixatives with the incoming washcoat resulting in a more even distribution of washcoat onto the upper face of the substrate.

The showerhead cavity may have a depth of 12 to 40 mm; preferably 15 to 30 mm.

The impermeable central body may be spaced from the showerhead plate by a gap of 5 to 10 mm.

Advantageously, it has been found that locating the impermeable central body at a spacing of 5 to 10 mm from the showerhead plate may improve washcoat circulation within the showerhead cavity, and in particular enable enough washcoat to flow back to the centre of the upper face of the showerhead plate to achieve a more even distribution of washcoat onto the upper face of the substrate.

In a second aspect, the present disclosure provides a baffle for forming a part of a washcoat showerhead as described above, wherein the baffle comprises an impermeable central body and a plurality of arms extending from the impermeable central body, the plurality of arms defining a plurality of flow apertures circumferentially arranged around the impermeable central body.

The plurality of arms may extend radially from the impermeable central body; and/or a width of each of the plurality of arms may increase from a location proximate to the impermeable central body to a location distal the impermeable central body; and/or the impermeable central body may be circular in shape in plan view; and/or the impermeable central body may have a diameter of 20 to 55 mm; preferably 25 to 50 mm; more preferably selected to be 27, 35 or 50 mm; and/or an upper face of the impermeable central body may comprise a protrusion; preferably wherein the protrusion is a conical, or part-conical surface; and/or the plurality of arms may be provided with mounting points for connecting fixatives; and/or the mounting points may be located at a distal end of each of the plurality of arms; and/or the mounting points may be located on a pitch circle diameter of 65 to preferably 70 mm, and may be centred on a central axis of the impermeable central body.

In a third aspect, the present disclosure provides a substrate coating apparatus comprising the washcoat showerhead as described above.

In a fourth aspect the present disclosure provides a method of coating a substrate with a washcoat using a washcoat showerhead;

- the washcoat showerhead being of the type comprising:
  - a housing having an inlet;
  - a showerhead plate; and
  - a baffle;
- the housing and showerhead plate defining a showerhead cavity and the baffle being located within the showerhead cavity;
- the showerhead plate comprising a plurality of nozzle apertures;
- the baffle comprising an impermeable central body and a plurality of arms extending from the impermeable central body, the plurality of arms defining a plurality of flow apertures circumferentially arranged around the impermeable central body;
- the baffle being mounted in the showerhead cavity such that the impermeable central body is spaced from the showerhead plate; and
- the impermeable central body being aligned below the inlet of the housing;
- wherein the method comprises the steps of:
  - locating the substrate below the washcoat showerhead;
  - passing washcoat through the showerhead cavity from the inlet to the nozzle apertures of the showerhead plate;
  - discharging the washcoat out of the nozzle apertures towards a face of the filter substrate;
- wherein during passage of the washcoat through the showerhead cavity the washcoat is diverted to flow around the impermeable central body of the baffle and through the plurality of flow apertures before being discharged through the nozzle apertures of the showerhead plate.

Various substrates are known including flow-through substrates (e.g. monolithic flow-through substrates) and filter substrates (e.g. monolithic filter substrates), beads and ceramic foams. However, preferably the substrate is selected from a flow-through substrate or a filter substrate (for example, a wall-flow filter substrate).

A flow-through substrate generally comprises a plurality of channels, typically extending therethrough, wherein each channel is open at both ends (i.e. an open end at the inlet and an open end at the outlet). The channels are formed between a plurality of walls. The walls generally comprise a non-porous material. A flow-through monolithic substrate comprising an array of parallel channels extending therethrough is also referred to herein as a honeycomb monolithic substrate.

By contrast, a filter substrate comprises a plurality of channels, wherein each channel has an open end and a closed end (e.g. a blocked or plugged end). Each channel is typically separated from an adjacent or neighbouring channel by a wall. The wall comprises, or consists essentially of, a porous material. Such porous materials are well known in the art.

In general, a filter substrate comprises a plurality of inlet channels and a plurality of outlet channels. Each inlet channel has an open end at a first face of the substrate and a closed (e.g. blocked or plugged) end at an opposite second face of the substrate (i.e. the second end is the opposite end to the first end), and each outlet channel has a closed (e.g. blocked or plugged) end at the first face of the substrate and an open end at the opposite second face of the substrate.

In a filter substrate, each channel having an open end at a first face of the substrate and a closed end at a second (i.e. opposite) face of the substrate is typically adjacent to a channel having a closed end at the first face of the substrate and an open end at the second (i.e. opposite) face of the substrate. Fluid communication between the channels is via a wall (e.g. through the porous material) of the substrate.

The wall typically has a thickness of 0.002 to 0.1 inches (0.05 to 2.54 mm), such as 0.005 to 0.050 inches (0.12 to 1.27 mm), particularly 0.010 to 0.025 inches (0.25 to 0.64 mm).

Typically, the channels of a filter substrate have alternately closed (e.g. blocked or plugged) and open ends. Thus, each inlet channel may be adjacent to an outlet channel, and each outlet channel may be adjacent to an inlet channel. When viewed from either end of the filter substrate, the channels may have the appearance of a chessboard.

However, the filter substrate may have an inlet channel (i.e. a "first" inlet channel) that is adjacent to another inlet channel (i.e. a "second" inlet channel) and optionally to an outlet channel, such as the "first" outlet channel and/or the "second" outlet channel. The filter substrate may have an outlet channel (i.e. a "first" outlet channel) that is adjacent to another outlet channel (i.e. a "second "outlet" channel) and optionally to an inlet channel, such as the "first" inlet channel and/or the "second" inlet channel.

The filter substrate may have from 100 to 700 cells (or "channels") per square inch ("cpsi"), particularly 250 to 400 cpsi.

A washcoat comprises a liquid and typically a catalyst component. The liquid may be a solution or a suspension. The suspension may be a colloidal suspension, such as a sol, or a non-colloidal suspension. When the liquid is a solution or a suspension, then it may be an aqueous solution or an aqueous suspension. Typically, the liquid is a suspension, particularly an aqueous suspension.

Typically, the liquid comprises a catalyst component. The expression "catalyst component" encompasses any component that may be included in a washcoat formulation that contributes to the activity of the resulting emissions control device, such as a platinum group metal (PGM), a support material (e.g. refractory oxide) or a zeolite. It is to be understood that the term "catalyst component" does not require that the component itself has catalytic activity in the strict sense of the meaning of the term "catalyst" (e.g. increasing the rate of reaction). For example, the catalyst component can refer to a material that is able to store or absorb NOx or a hydrocarbon. Liquids (e.g. washcoats) comprising a catalyst component are known to those skilled in the art. The catalyst component(s) included in the liquid will depend on the product that is to be manufactured.

The coated filter substrate or product obtained by a method of the invention or using an apparatus of the invention may, for example, be a filter substrate comprising an oxidation catalyst (e.g. a catalysed soot filter [CSF]), a selective catalytic reduction (SCR) catalyst (e.g. the product may then be called a selective catalytic reduction filter [SCRF] catalyst), a NOx adsorber composition (e.g. the product may then be called a lean NOx trap filter [LNTF]), a three-way catalyst composition (e.g. the product may then be called a gasoline particulate filter [GPF]), an ammonia slip catalyst [ASC] or a combination of two or more thereof (e.g. a filter substrate comprising a selective catalytic reduction (SCR) catalyst and an ammonia slip catalyst [ASC]).

In addition to the "catalyst component", the liquid may further comprise a formulation aid. The term "formulation aid" refers to a component that is included in the liquid to modify its chemical or physical properties for coating onto a filter substrate. The formulation aid may, for example, aid the dispersion of a catalytic component in the liquid or change the viscosity of the liquid. The formulation aid may not be present in the final coated filter substrate product (e.g. it may decompose or degrade during calcination). The formulation aid may, for example, be an acid, a base, a thickener (e.g. organic compound thickener) or a binder.

The washcoat may have a viscosity of 1-3000 cP at 50 rpm Brookfield, preferably 100-3000 cP at 50 rpm Brookfield, more preferably less than 600 cP at 50 rpm Brookfield; in one embodiment the washcoat may have a viscosity of 100 to 3000 cP at 50 rpm Brookfield, in another embodiment the washcoat may have a viscosity of 1 to 350 cP at 50 rpm Brookfield, more preferably 1 to 100 cP at 50 rpm Brookfield. In the present application all viscosity measurements refer to measurements carried out on a Brookfield DV-II+ Pro (LV) viscometer using a SC4-18 spindle, available from Brookfield Engineering Laboratories, Inc., Middleboro, MA, USA.

The washcoat may be supplied to the washcoat showerhead from a supply of washcoat using a piston which is movable within a bore, the bore having an internal diameter of 38 mm to 170 mm and the piston being moved at 45-150 mm/s.

The washcoat may be supplied to the washcoat showerhead at a rate of 9-540 $cm^3 s^{-1}$, preferably at a rate of 9-270 $cm^3 s^{-1}$.

BRIEF DESCRIPTION OF THE DRAWINGS

Embodiments of the present disclosure will now be described, by way of example only, with reference to the accompanying drawings, in which.

DETAILED DESCRIPTION

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the products may be combined with those disclosed in relation to the method and vice versa.

Figure 1:
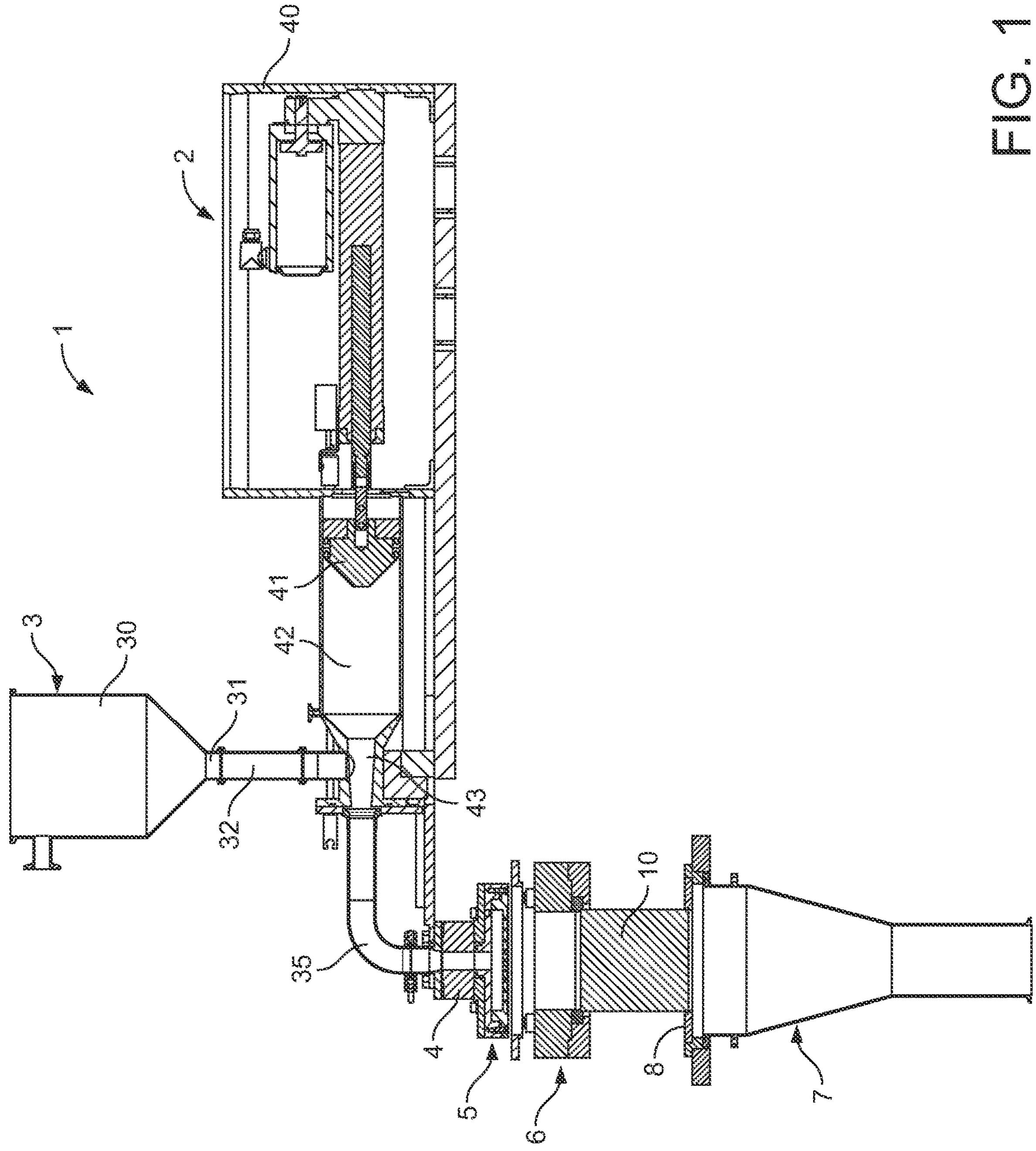
FIG. 1 is a cross-sectional view of a coating apparatus.

FIG. 1 shows a cross-sectional view of a coating apparatus 1 that may be used for coating a substrate 10 with a washcoat.

The coating apparatus 1 may comprise a depositor 2 having a housing 40 containing apparatus for activating a dispensing mechanism. As shown, the dispensing mechanism may comprise a piston 41 which is axially moveable within a bore 42 to displace a fluid out of an outlet 43 towards a conduit 35 located downstream of the depositor 2.

The coating apparatus 1 may further comprises a hopper 3 defining a hopper reservoir 30 having an outlet 31 connecting with the outlet 43 of the depositor 2 via a diaphragm valve 32. The hopper 3 may be filled with a washcoat that has been formulated and pre-mixed at another location. The washcoat may be pumped into the hopper reservoir 30 or may be fed under gravity into the hopper reservoir 30 through suitable conduits.

The outlet 43 of the depositor 2 fluidly connects with the conduit 35 which in turn may extend into fluid communication with a dosing valve 4. A washcoat showerhead 5 may be connected to a lower face of the dosing valve 4 with the washcoat showerhead 5 being positioned above the substrate 10.

The substrate 10 may be located and positioned between a headset 6 and a pallet insert 8. A vacuum apparatus including a vacuum cone 7 may be located beneath the substrate 10.

Figure 2:
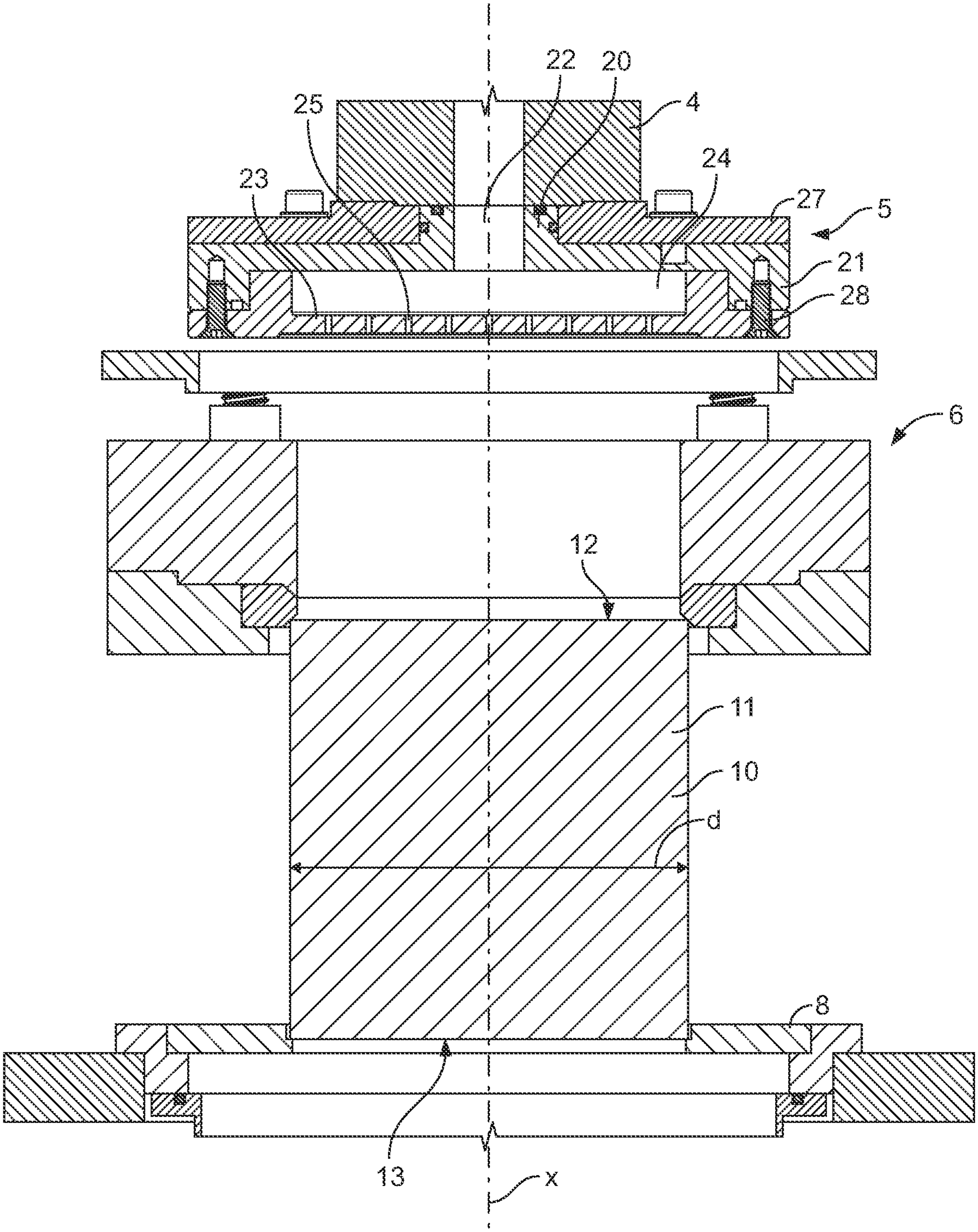
FIG. 2 is a an enlarged view of a portion of FIG. 1.

FIG. 2 shows an enlarged portion of the coating apparatus 1 of FIG. 1 and shows in more detail how the substrate 10 may be positioned relative to the washcoat showerhead 5 and headset 6.

The substrate 10 may be a monolithic block having a substrate body 11 which may have a uniform cross-sectional shape along its longitudinal length. The substrate body 11 may have a circular or near circular shape in cross-section. The substrate body 11 may have a diameter, d.

The substrate body 11 may be positioned to extend between the headset 6 and the pallet insert 8 such that an upper face 12 of the substrate body 11 is upper most and a lower face 13 of the substrate body 11 is lowermost. The washcoat showerhead 5 may be located above the headset 6 and may be preferably aligned with the headset 6 and substrate 10 such that a central longitudinal axis, x, of the washcoat showerhead 5 is coincident with the central longitudinal axis of both the headset 6 and substrate 10 as shown in FIG. 2.

The washcoat showerhead 5 may comprise a showerhead housing 21 to which may be coupled, on a lower side, a showerhead plate 23 by means of bolts 28. An adaptor plate 27 may be coupled to an upper side of the showerhead housing 21, also by means of bolts.

The showerhead housing 21 may comprise a centrally located aperture defining an inlet 22 to a showerhead cavity 24 that is defined between the showerhead housing 21 and the showerhead plate 23. The axis of the inlet 22 may be coincident with longitudinal axis x. The adaptor plate 27 may also comprise a centrally located aperture, which may be coincident with longitudinal axis x, and sized to receive a central portion 20 of the showerhead housing 21. The dosing valve 4 may be brought into, and held in, fluid communication with the inlet 22 of the showerhead housing 21.

The showerhead plate 23 may be provided with an array of nozzle apertures 25.

In use, diaphragm valve 32 is opened and washcoat is drawn into the bore 42 from the hopper reservoir 30 by movement of the piston to the right (as viewed in FIG. 1). The diaphragm valve 32 is then shut and the dose of washcoat is then displaced through conduit 35 by action of the piston 41 of the depositor 2 moving to the left (as viewed in FIG. 1). The washcoat passes through the dosing valve 4 and inlet 22 into the showerhead cavity 24. The washcoat then passes through the nozzle apertures 25 and drops down into contact with the upper face 12 of the substrate 10. The washcoat is then drawn down through the passages of the substrate 10. Drawing of the washcoat through the substrate 10 is driven, at least in part, by a suction force applied to the lower face 13 of the substrate 10 by the vacuum cone 7.

Figure 3:
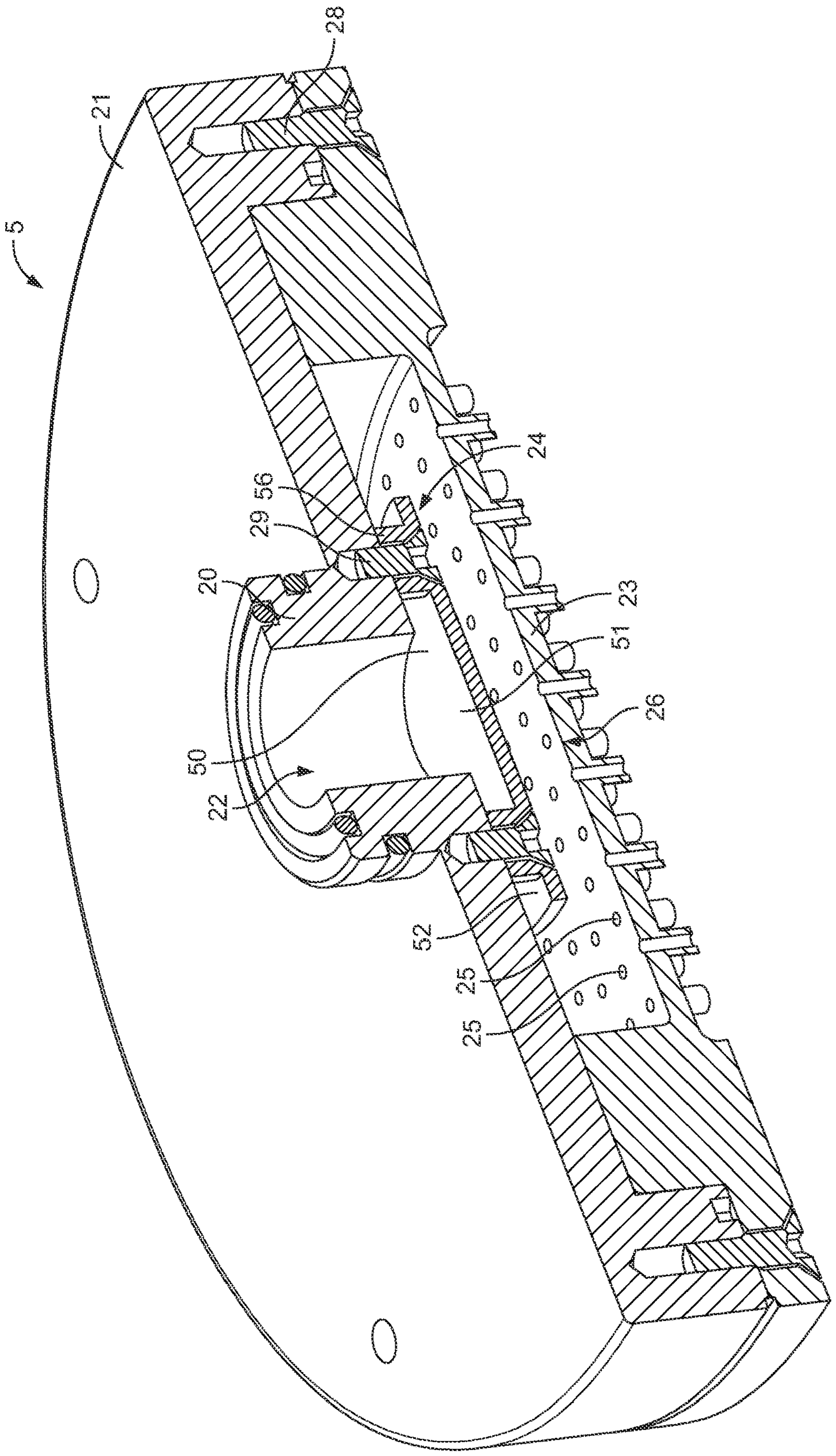
FIG. 3 is a cross-sectional perspective view of a showerhead according to the present disclosure.
Figure 4:
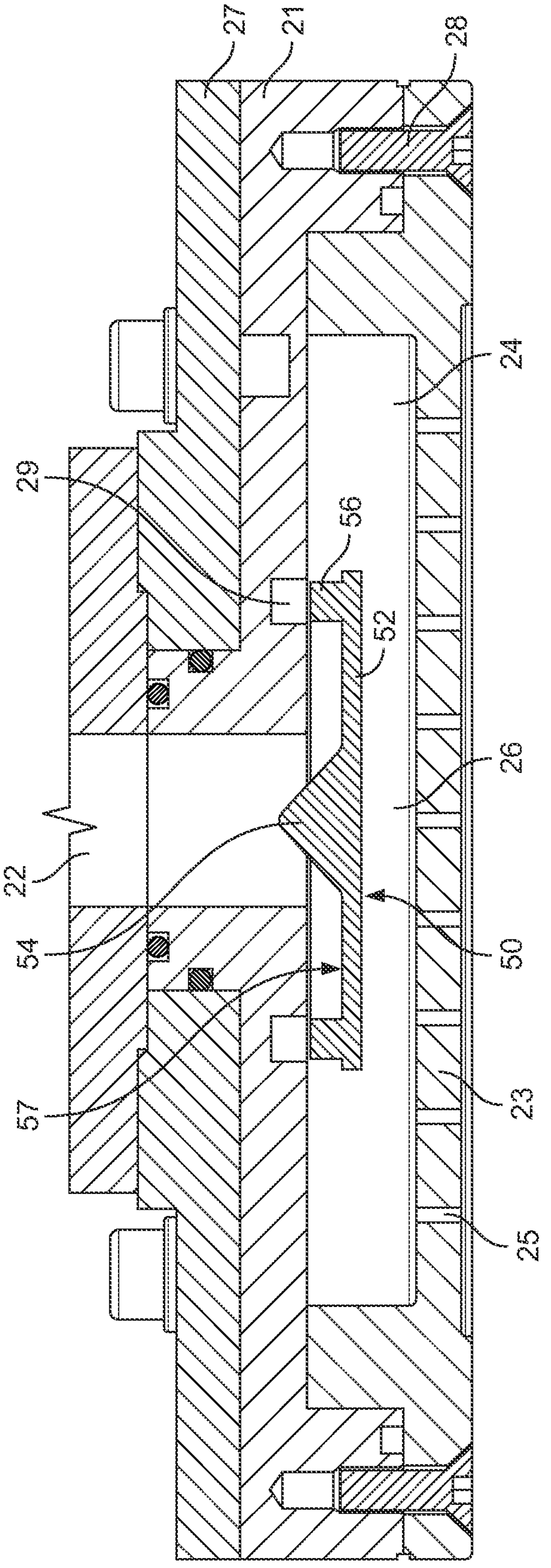
FIG. 4 is a cross-sectional view of another showerhead according to the present disclosure.
Figure 5:
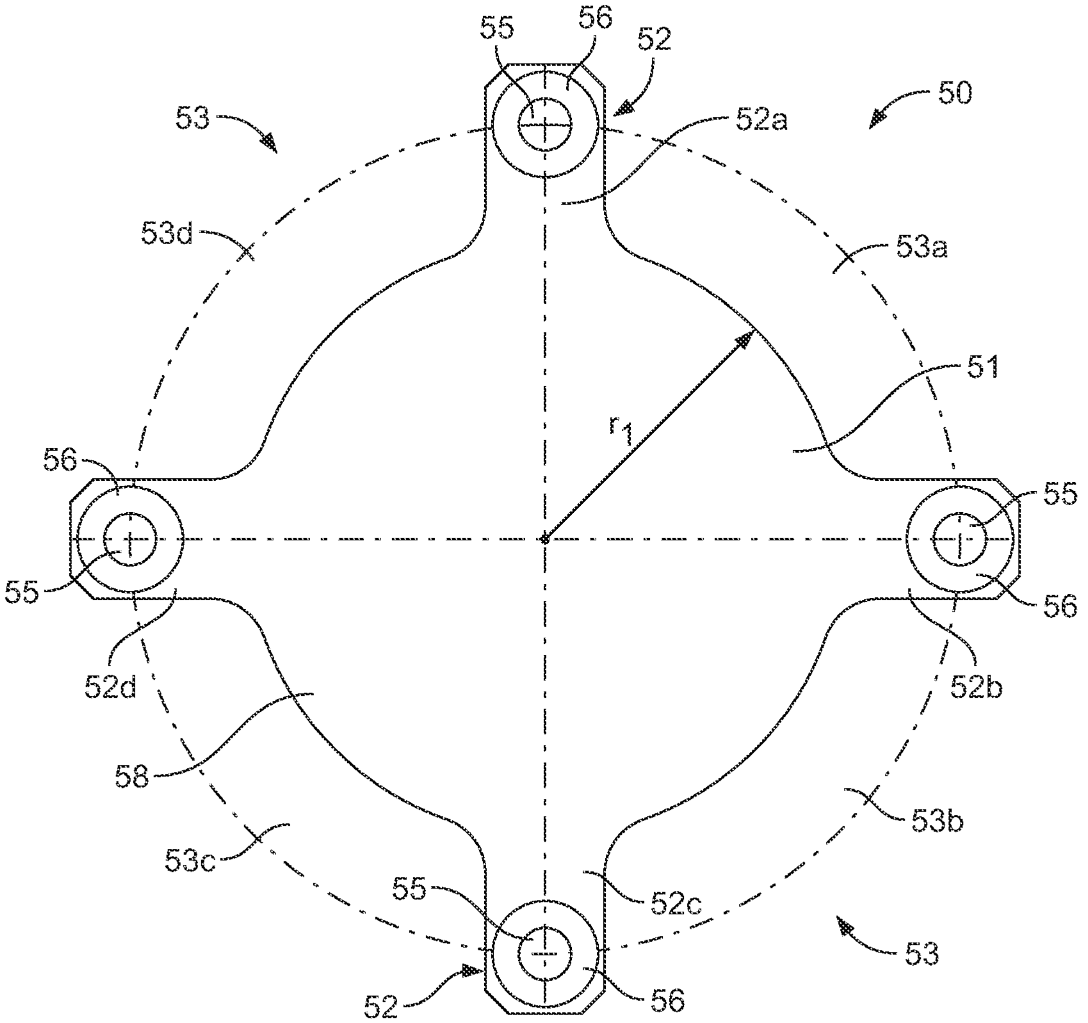
FIG. 5 is a view from underneath of a first version of a baffle according to the present disclosure.

FIGS. 3 to 5 illustrate a first version of the baffle 50 according to the present disclosure. FIG. 3 illustrates a washcoat showerhead 5 according to the present disclosure wherein a baffle 50 is provided within the showerhead cavity 24.

The showerhead cavity 24 may have a depth of 12 to 40 mm, preferably 15 to 30 mm. The showerhead cavity 24 may have a diameter of 150 to 200 mm, preferably 160 to 170 mm. The showerhead plate 23 may extend across the full diameter of the showerhead cavity 24. Nozzle apertures 25 may be arrayed across the showerhead plate 23. The nozzle apertures 25 may be arrayed in a regular or irregular array. The nozzle apertures 25 may be arranged in a plurality of concentric circular arrays.

The baffle 50 comprises an impermeable central body 51 and a plurality of arms 52 which extend from the impermeable central body 51 to define a plurality of flow apertures 53 circumferentially arranged around the impermeable central body 51.

The baffle 50 may be mounted to the showerhead housing 21 by means of bolts 29 that may extend through bolt apertures 55 towards the distal end of each of the arms 52. The mounting points of baffle 50 may surround, but preferably do not impinge on, the inlet 22 of the showerhead housing 21. The bolts 29 may be 4 mm bolts. Each of the bolt apertures 55 may be surrounded by a standoff ring 56 which may serve to define the spacing between an upper face 57 of the baffle 50 and an upper interior face of the showerhead housing 21 as well as defining a spacing 26 between a lower face 58 of the baffle 50 and an upper interior face of the showerhead plate 23. Each standoff ring 56 may have a height of 4 to 6 mm, preferably 4.5 mm. The spacing 26 may be 5 to 10 mm, preferably approximately 8 mm.

The baffle 50 (of the version shown in FIGS. 3 to 5 and the other versions described hereafter) may be provided with an upper face 57 which may be flat as shown in FIG. 3 or may be provided with a conical or part conical protrusion 54 centrally located on the upper face 57 as shown in FIG. 4.

As most clearly seen in FIG. 5, the baffle 50 (whether or not provided with a conical or part conical protrusion 54) may have a cross-like shape wherein four arms 52*a-d* are provided. Preferably the four arms 52*a-d* are equi-spaced around the circumference of the impermeable central body 51 such at they are each 90° spaced from its neighbouring arms. Similarly, the baffle 50 may comprise four flow apertures 53*a-d* that are equi-spaced around the circumference of the impermeable central body 51 such at they are each 90° spaced from its neighbouring flow apertures.

The length of the arms 52*a-d* may be relatively short compared to the diameter of the impermeable central body 51. The arms 52*a*-4 may have a uniform width and depth. In the illustrated example of FIG. 5 the bolt apertures 55 may be arranged on a pitch circle diameter of 70 mm and the impermeable central body 51 may have a radius $r_1$ of 25 mm and a diameter of 50 mm.

The baffle 50 may be formed of stainless steel, for example type 316.

The first version of baffle 50 may find particular beneficial use when coating a substrate 10 that has a circular cross-sectional shape and a diameter less than approximately 175 mm, more particularly less than 172.8 mm. The first version of baffle 50 may also find particular beneficial use when coating a substrate 10 that has a non-circular cross-sectional shape. Further, the first version of baffle 50 may find particular beneficial use when coating a substrate 10 for a selective catalytic reduction filter (SCRF), a light duty diesel catalytic soot filter (LDD CSF), or a gasoline particulate filter (GPF).

Figure 6:
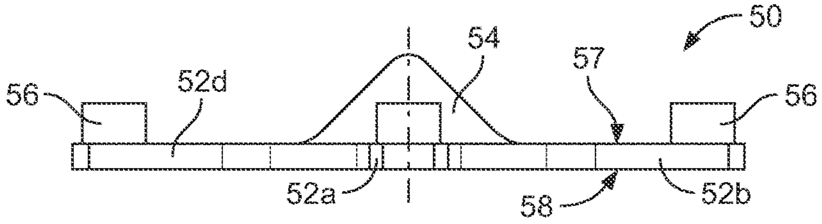
FIG. 6 is a side elevational view of a second version of a baffle according to the present disclosure.
Figure 7:
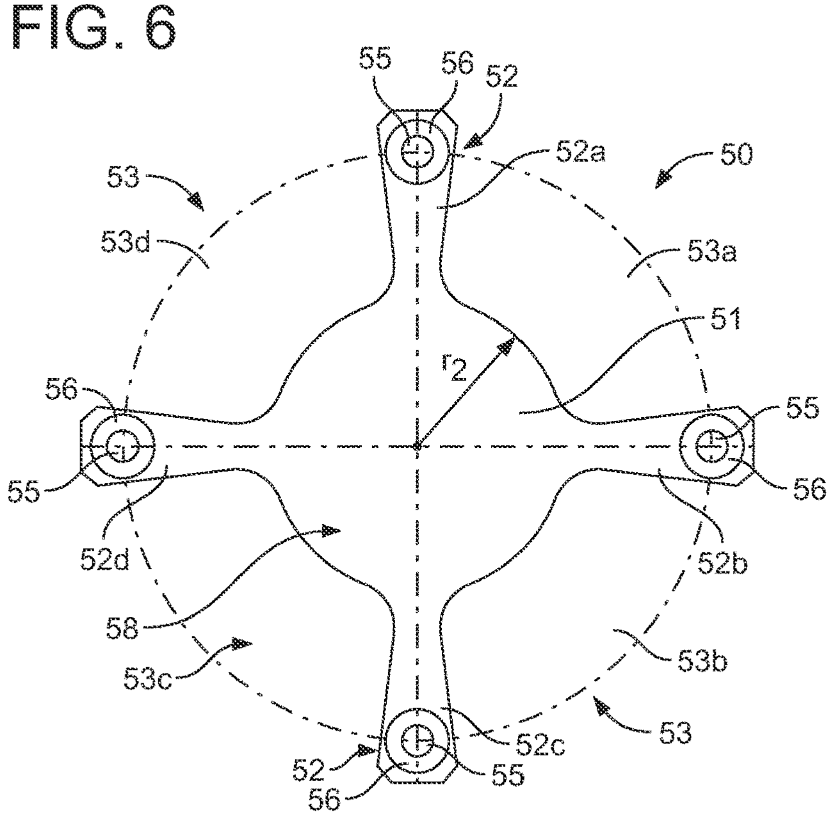
FIG. 7 is a view from underneath of the second version of baffle of FIG. 6.
Figure 8:
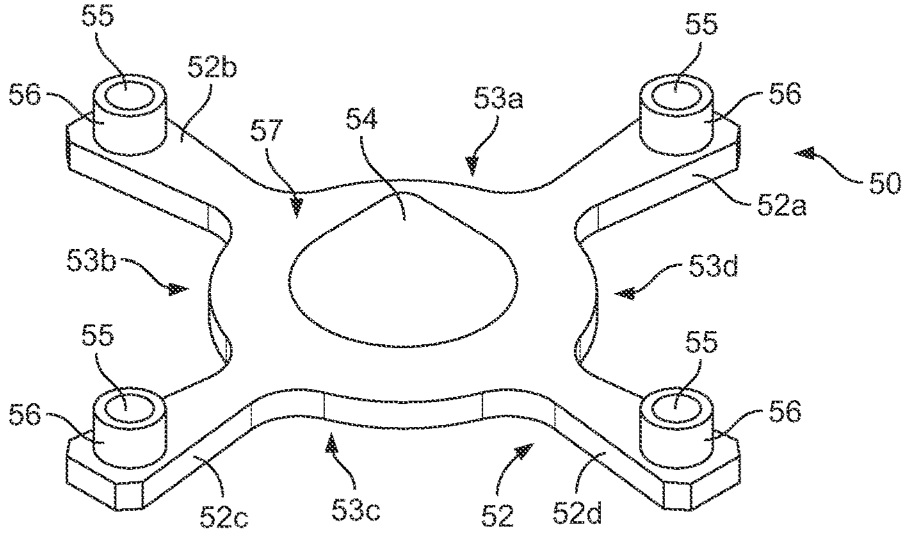
FIG. 8 is a perspective view from above of the second version of baffle of FIG. 6.

FIGS. 6 to 8 illustrate a second version of the baffle 50 according to the present disclosure. As most clearly seen in FIGS. 7 and 8, the baffle 50 (whether or not provided with a conical or part conical protrusion 54) may have a cross-like shape wherein four arms 52*a-d* are provided. As with the first version, the four arms 52*a-d* may be equi-spaced around the circumference of the impermeable central body 51 such that they are each 90° spaced from its neighbouring arms. Similarly, the baffle 50 may comprise four flow apertures 53*a-d* that are equi-spaced around the circumference of the impermeable central body 51 such at they are each 90° spaced from its neighbouring flow apertures.

The length of the arms 52*a-d* is longer than in the first version. In the illustrated example of FIG. 7 the bolt apertures 55 may be arranged on a pitch circle diameter of 70 mm and the impermeable central body 51 may have a radius $r_2$ of 17.5 mm and a diameter of 35 mm. Consequently, the area of the impermeable central body 51 is reduced and the open area of the flow apertures 53*a-d* is increased compared to the first version of baffle 50.

The arms 52*a*-4 may have a uniform depth. The width of the arms 52*a-d* may taper. The width of each of the plurality of arms 52*a-d* may increase from a location proximate to the impermeable central body 51 to a location distal the impermeable central body 51.

The baffle 50 may be formed of stainless steel, for example type 316.

The second version of baffle 50 may find particular beneficial use when coating a substrate that has a diameter greater than approximately 250 mm, more particularly greater than 266.7 mm. Further, the second version of baffle 50 may find particular beneficial use when coating a substrate 10 for a heavy-duty diesel filter (HDD).

Figure 9:
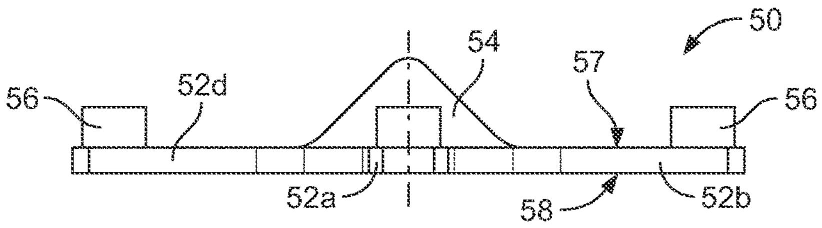
FIG. 9 is a side elevational view of a third version of a baffle according to the present disclosure.
Figure 10:
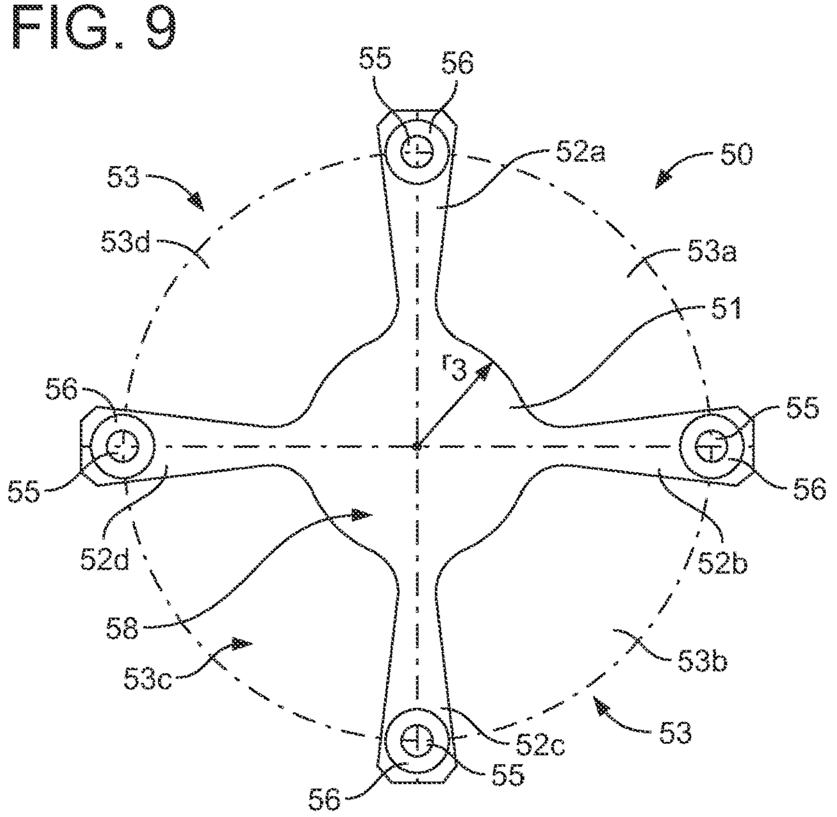
FIG. 10 is a view from underneath of the third version of baffle of FIG. 9.
Figure 11:
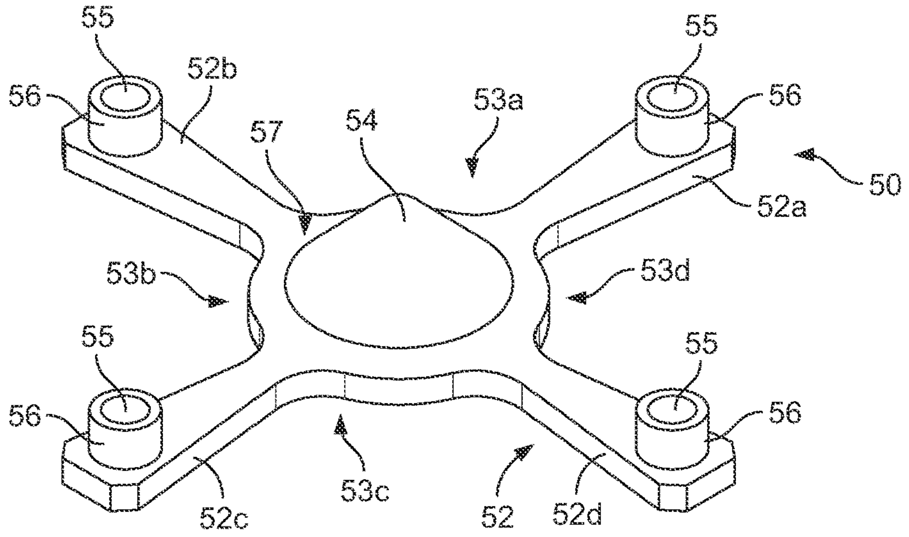
FIG. 11 is a perspective view from above of the third version of baffle of FIG. 6.

FIGS. 9 to 11 show a third version of baffle 50 according to the present disclosure. As most clearly seen in FIGS. 10 and 11, the baffle 50 (whether or not provided with a conical or part conical protrusion 54) may have a cross-like shape wherein four arms 52*a-d* are provided. As with the first and second versions, the four arms 52*a-d* may be equi-spaced around the circumference of the impermeable central body 51 such that they are each 90° spaced from its neighbouring arms. Similarly, the baffle 50 may comprise four flow apertures 53*a-d* that are equi-spaced around the circumference of the impermeable central body 51 such at they are each 90° spaced from its neighbouring flow apertures.

The length of the arms 52*a-d* is longer than in the second version. In the illustrated example of FIG. 10 the bolt apertures 55 may be arranged on a pitch circle diameter of and the impermeable central body 51 may have a radius $r_3$ of 13.5 mm and a diameter of 27 mm. Consequently, the area of the impermeable central body 51 is reduced and the open area of the flow apertures 53*a-d* is increased compared to the second version of baffle 50.

The arms 52*a*-4 may have a uniform depth. As with the second version, the width of the arms 52*a-d* may taper. The width of each of the plurality of arms 52*a-d* may increase from a location proximate to the impermeable central body 51 to a location distal the impermeable central body 51.

The baffle 50 may be formed of stainless steel, for example type 316.

The third version of baffle 50 may find particular beneficial use when coating a substrate 10 that has a diameter between 170 mm and 275 mm, more particularly between 172.8 mm and 266.7 mm. Further, the third version of baffle 50 may find particular beneficial use when coating a substrate 10 for a catalytic soot filter (CSF).

In use, washcoat may be supplied to the washcoat showerhead 5 from a supply of washcoat using the piston 41 of the depositor 2. The piston 41 is movable within the bore 42, and the bore 42 may have an internal diameter of 38 mm to 170 mm and the piston 41 may be moved at 45-150 mm/s. The washcoat is displaced along conduit 35 through dosing valve 4 and into the washcoat showerhead 5. The washcoat may be supplied to the washcoat showerhead 5 at a rate of 7-640 $cm^3\ s^{-1}$.

Washcoat may enter the showerhead cavity 24 through the inlet 22. The washcoat comes into contact with the impermeable central body 51 of the baffle (including the conical or part-conical protrusion where present) before reaching the showerhead plate 23. The washcoat is therefore deflected laterally towards the periphery of the showerhead cavity 24 so that the washcoat does not immediately reach the nozzle apertures 25 located at or near the centre of the showerhead plate 23. The washcoat flows through the plurality of flow apertures 53*a-d* of the baffle and then circulates within the showerhead cavity 24 to pass through the nozzle apertures 25. Due to the configuration of the size and shape of the arms 52*a-d* and flow apertures 53*a-d* it may be enabled that sufficient washcoat recirculates back to a centre of the showerhead plate 23 such that a uniform or near uniform discharge of washcoat through the nozzle apertures 25 is achieved.

The washcoat then is deposited onto the upper face 12 of the substrate 10 and is drawn through the passages of the substrate body 11 by the suction force applied by the vacuum cone 7.

The washcoat comprises a liquid and typically a catalyst component. The liquid may be a solution or a suspension. The suspension may be a colloidal suspension, such as a sol, or a non-colloidal suspension. When the liquid is a solution or a suspension, then it may be an aqueous solution or an aqueous suspension. Typically, the liquid is a suspension, particularly an aqueous suspension.

Typically, the liquid comprises a catalyst component. The expression “catalyst component” encompasses any component that may be included in a washcoat formulation that contributes to the activity of the resulting emissions control device, such as a platinum group metal (PGM), a support material (e.g. refractory oxide) or a zeolite. It is to be understood that the term “catalyst component” does not require that the component itself has catalytic activity in the strict sense of the meaning of the term “catalyst” (e.g. increasing the rate of reaction). For example, the catalyst component can refer to a material that is able to store or absorb NOx or a hydrocarbon. Liquids (e.g. washcoats) comprising a catalyst component are known to those skilled in the art. The catalyst component(s) included in the liquid will depend on the product that is to be manufactured.

The coated filter substrate or product obtained by a method of the invention or using an apparatus of the invention may, for example, be a filter substrate comprising an oxidation catalyst (e.g. a catalysed soot filter [CSF]), a selective catalytic reduction (SCR) catalyst (e.g. the product may then be called a selective catalytic reduction filter [SCRF] catalyst), a NOx adsorber composition (e.g. the product may then be called a lean NOx trap filter [LNTF]), a three-way catalyst composition (e.g. the product may then be called a gasoline particulate filter [GPF]), an ammonia slip catalyst [ASC] or a combination of two or more thereof (e.g. a filter substrate comprising a selective catalytic reduction (SCR) catalyst and an ammonia slip catalyst [ASC]).

In addition to the “catalyst component”, the liquid may further comprise a formulation aid. The term “formulation aid” refers to a component that is included in the liquid to modify its chemical or physical properties for coating onto a filter substrate. The formulation aid may, for example, aid the dispersion of a catalytic component in the liquid or change the viscosity of the liquid. The formulation aid may not be present in the final coated filter substrate product (e.g. it may decompose or degrade during calcination). The formulation aid may, for example, be an acid, a base, a thickener (e.g. organic compound thickener) or a binder.

The washcoat may have a viscosity of 1-3000 cP at 50 rpm Brookfield, preferably 100-3000 cP at 50 rpm Brookfield, more preferably less than 600 cP at 50 rpm Brookfield; in one embodiment the washcoat may have a viscosity of 100 to 3000 cP at 50 rpm Brookfield, in another embodiment the washcoat may have a viscosity of 1 to 350 cP at 50 rpm Brookfield, more preferably 1 to 100 cP at 50 rpm Brookfield. (All measurements obtained on a Brookfield DV-II+ Pro (LV) viscometer using a SC4-18 spindle.)

Figure 12A:
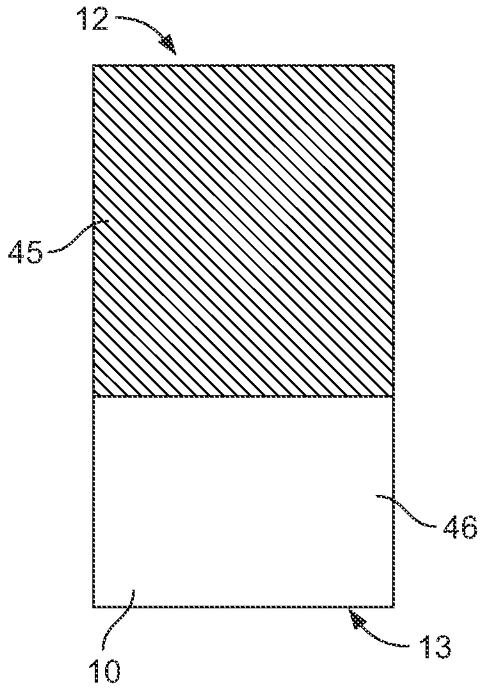
FIGS. 12*a* to 12*d* are schematic representations of desirable and undesirable coating profiles.

In order to maximise utilisation of the substrate volume and to prevent applying multiple coats to portions of the substrate 10 and to prevent pull-through of the washcoat, it is desirable to achieve a consistent and predictable coating profile. For example, a flat coating profile is desirable as illustrated schematically in FIG. 12*a*. As shown the substrate 10 has a coated portion 45 which has been coated by the washcoat and an uncoated portion 46 where the washcoat has not reached. The interface between the coated portion 45 and the uncoated portion 46 is flat which is a desirable outcome.

Figure 12B:
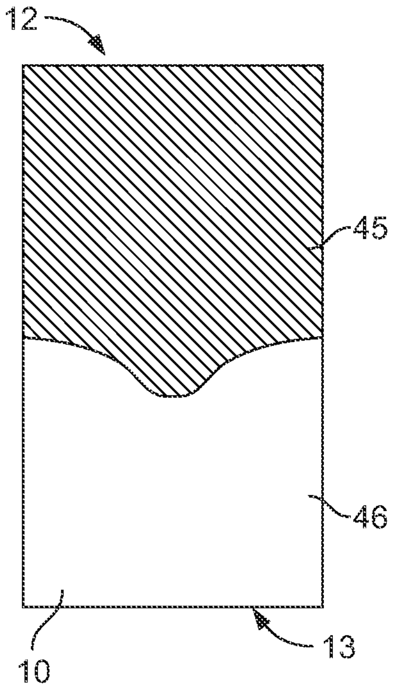

FIG. 12*b* illustrates an undesirable "V-shaped" interface between the coated portion 45 and the uncoated portion 46. This is believed to result where too much washcoat is applied to a central portion of the upper face 12 of the substrate 10 and may be a particular problem where the washcoat has a low viscosity.

Figure 12C:
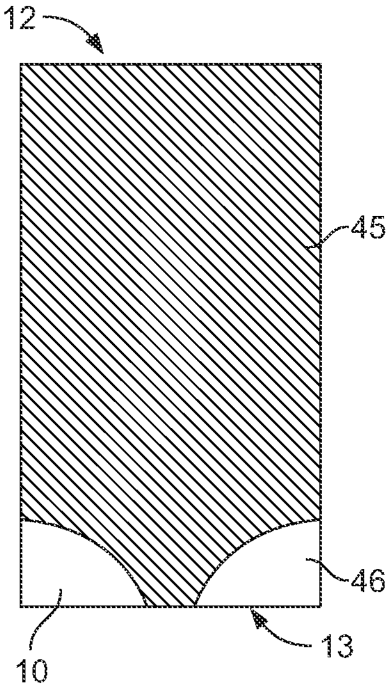

FIG. 12*c* illustrates a coating profile that is similar to that of FIG. 12*b* but shows how pull-through may occur where washcoat is pulled out of a central portion of the lower face 13 of the substrate before a peripheral portion of the substrate is adequately coated.

Figure 12D:
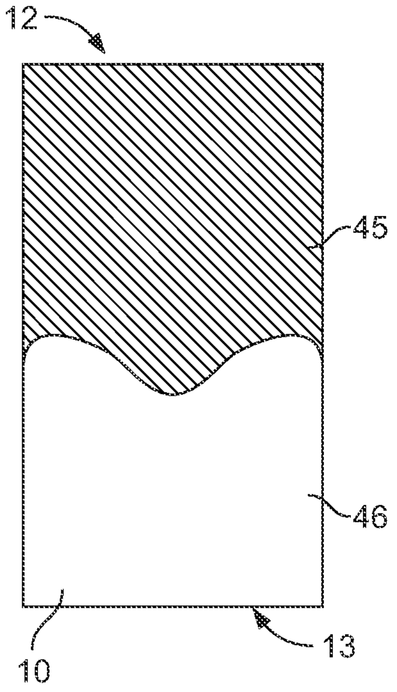

Finally, FIG. 12*d* illustrates another undesirable coating profile which has an "M-shaped" interface between the coated portion 45 and the uncoated portion 46. This is believed to result where the washcoat is unable to recirculate sufficiently back into a centre of the showerhead plate 23 before it passes through the nozzle apertures 25.

Comparative Example

A catalyst washcoat for a substrate was prepared having a solids content of 10% and a Newtonian viscosity of 5 cP over a spindle rotation speed 25-100 rpm using a Brookfield DV-II+ Pro (LV) and a SC4-18 spindle.

Figure 13:
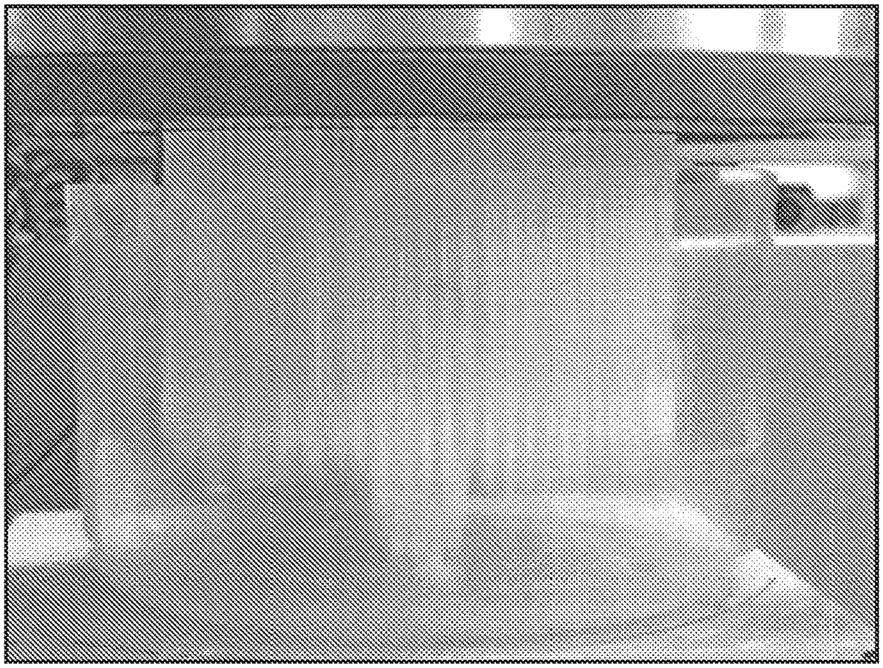
FIG. 13 shows a low viscosity washcoat being deposited from a washcoat showerhead without modifications.

When the washcoat was coated onto a silicon carbide filter substrate using the coating apparatus 1 of FIG. 1, utilising a washcoat showerhead 5 without a baffle present, more washcoat is ejected out of the centre holes of the washcoat showerhead 5, as shown in FIG. 13.

Figure 14:
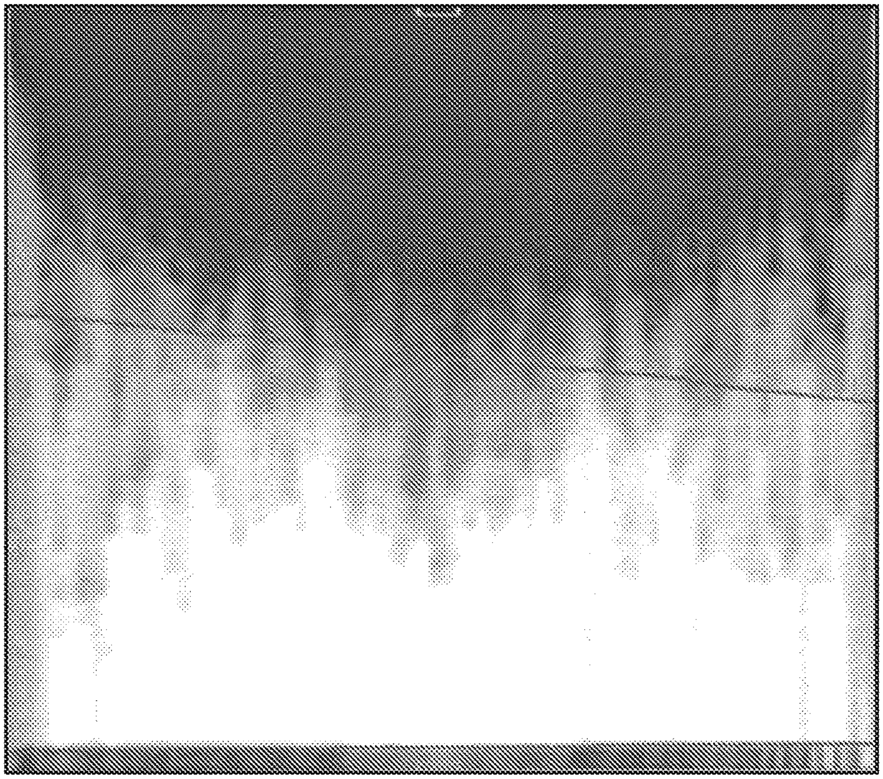
FIG. 14 is an x-ray image of a low viscosity washcoat deposited onto a substrate from a washcoat showerhead without modifications.

This was found to result in a v-shaped, uneven, coating profile shown in FIG. 14. This figure is an x-ray image of the substrate where the coating of washcoat is shown as darker against the light bare substrate due to the higher mass density of the coating of washcoat.

Example 1

To ameliorate the effect seen in FIG. 14, the first version of the baffle 50, as shown in FIGS. 3 to 5, was added to the showerhead housing 21 as shown in FIG. 3.

Figure 15:
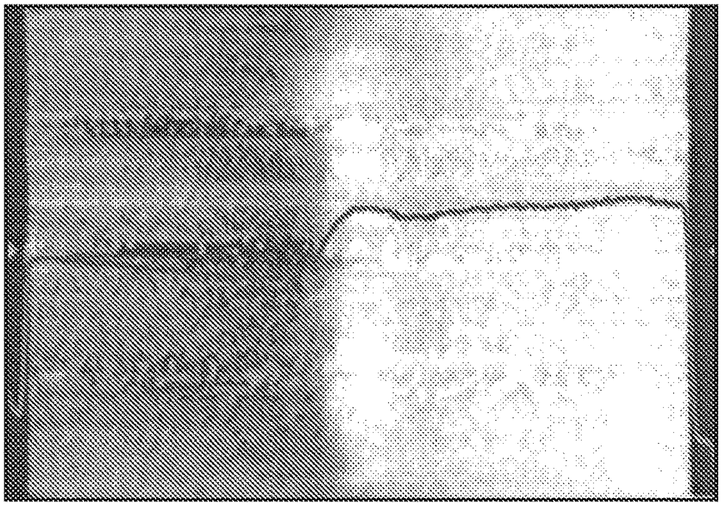
FIG. 15 is an x-ray image of a washcoat deposited onto a substrate from a washcoat showerhead using the first version of baffle of the present disclosure.

A silicon carbide filter substrate 10 of 143.8 mm diameter was then coated using this baffle plate 50 and the same catalyst washcoat as the above comparative example. A more even coating profile was obtained as shown by the x-ray image of FIG. 15 where the coating of washcoat is shown as darker against the light bare substrate due to the higher mass density of the coating of washcoat.

Example 2

To ameliorate the effect seen in FIG. 14, the second version of the baffle 50, as shown in FIGS. 6 to 8, was added to the showerhead housing 21.

Figure 16:
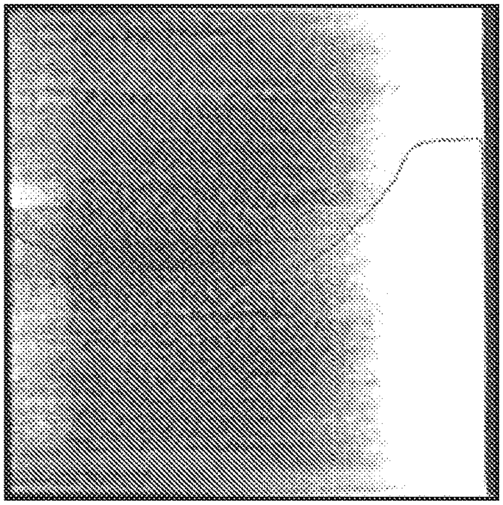
FIG. 16 is an x-ray image of a washcoat deposited onto a substrate from a washcoat showerhead using the second version of baffle of the present disclosure.

A silicon carbide filter substrate 10 of 330.3 mm diameter was then coated using this baffle plate 50 and the same catalyst washcoat as the above comparative example. A more even coating profile was obtained as shown by the x-ray image of FIG. 16 where the coating of washcoat is shown as darker against the light bare substrate due to the higher mass density of the coating of washcoat.

Example 3

To ameliorate the effect seen in FIG. 14, the third version of the baffle 50, as shown in FIGS. 9 to 11, was added to the showerhead housing 21.

Figure 17:
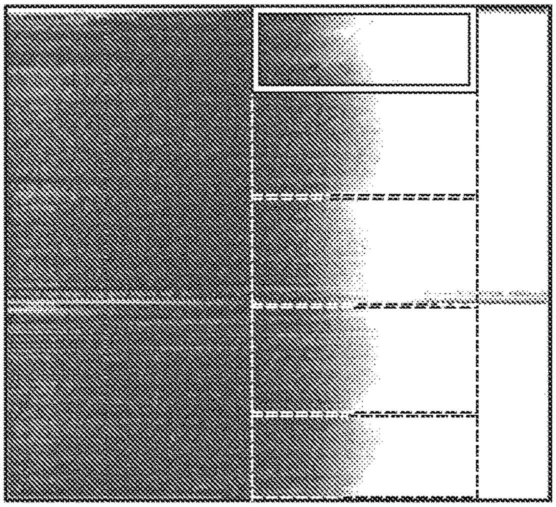
FIG. 17 is an x-ray image of a washcoat deposited onto a substrate from a washcoat showerhead using the third version of baffle of the present disclosure.

A silicon carbide filter substrate 10 of 172.8 mm diameter was then coated using this baffle plate 50 and the same catalyst washcoat as the above comparative example. A more even coating profile was obtained as shown by the x-ray image of FIG. 17 where the coating of washcoat is shown as darker against the light bare substrate due to the higher mass density of the coating of washcoat.

As noted above, the present applicant has found that desirable flat, or near flat, coating profiles may be achieved over a wide range of sizes of substrate using a washcoat showerhead 5 comprising a baffle 50 as described herein.

For the avoidance of doubt, the entire contents of all documents acknowledged herein are incorporated herein by reference.

The invention claimed is:

1. A method of coating a substrate with a liquid washcoat using a washcoat showerhead;
- the washcoat showerhead comprising:
  - a housing having an inlet;
  - a showerhead plate; and
  - a baffle;
- the housing and showerhead plate defining a showerhead cavity and the baffle being located within the showerhead cavity;
- the showerhead plate comprising a plurality of nozzle apertures;
- the baffle comprising an impermeable central body and a plurality of arms extending from the impermeable central body, the plurality of arms defining a plurality of flow apertures circumferentially arranged around the impermeable central body and an upper face of the impermeable central body facing the inlet comprises a protrusion;
- the baffle being mounted in the showerhead cavity such that the impermeable central body is spaced from the showerhead plate; and
- the impermeable central body being aligned below the inlet of the housing;
- wherein the method comprises the steps of:
  - locating the substrate below the washcoat showerhead;
  - passing the liquid washcoat through the showerhead cavity from the inlet to the nozzle apertures of the showerhead plate;
  - discharging the liquid washcoat out of the nozzle apertures towards a face of the filter substrate;
- wherein during passage of the washcoat through the showerhead cavity the washcoat is diverted to flow around the impermeable central body of the baffle and through the plurality of flow apertures before being discharged through the nozzle apertures of the showerhead plate.

2. The method of claim 1, wherein the substrate is selected from a wall flow filter substrate and a flow-through substrate.

3. The method of claim 1, wherein the washcoat comprises an oxidation catalyst, a selective catalytic reduction (SCR) catalyst, a NOx adsorber composition, a three-way catalyst composition, an ammonia slip catalyst (ASC) or a combination of two or more thereof.

4. The method of claim 1, wherein the washcoat has a viscosity of 1-3000 cP at 50 rpm Brookfield.

5. The method of claim 1, wherein the washcoat is supplied to the washcoat showerhead from a supply of washcoat using a piston which is movable within a bore, the bore having an internal diameter of 38 mm to 170 mm and the piston being moved at 45-150 mm/s.

6. The method of claim 1, wherein the washcoat is supplied to the washcoat showerhead at a rate of 9-270 $cm^3 s^{-1}$.

7. The method of claim 1, wherein the baffle comprises four arms extending from the impermeable central body, the four arms defining four flow apertures circumferentially arranged around the impermeable central body.

8. The method of claim 1, wherein the plurality of arms extend radially from the impermeable central body.

9. The method of claim 1, wherein the impermeable central body is circular in shape in plan view.

10. The method of claim 1, wherein the impermeable central body has a diameter greater than a diameter of the inlet to the housing; and wherein a central longitudinal axis of the inlet and a central axis of the impermeable central body are coincident.

11. The method of claim 1, wherein the impermeable central body has a diameter of 20 to 55 mm.

12. The method of claim 1, wherein the inlet of the housing has an internal diameter of up to 25.4 mm.

13. The method of claim 1, wherein the protrusion is a conical, or part-conical surface.

14. The method of claim 1, wherein the baffle is mounted to at least one of the housing and the showerhead plate.

* * * * *